Oct. 24, 1950     P. J. KOHLER     2,527,138
APPARATUS FOR MAKING RESISTANCE MEASUREMENTS
Filed March 8, 1945
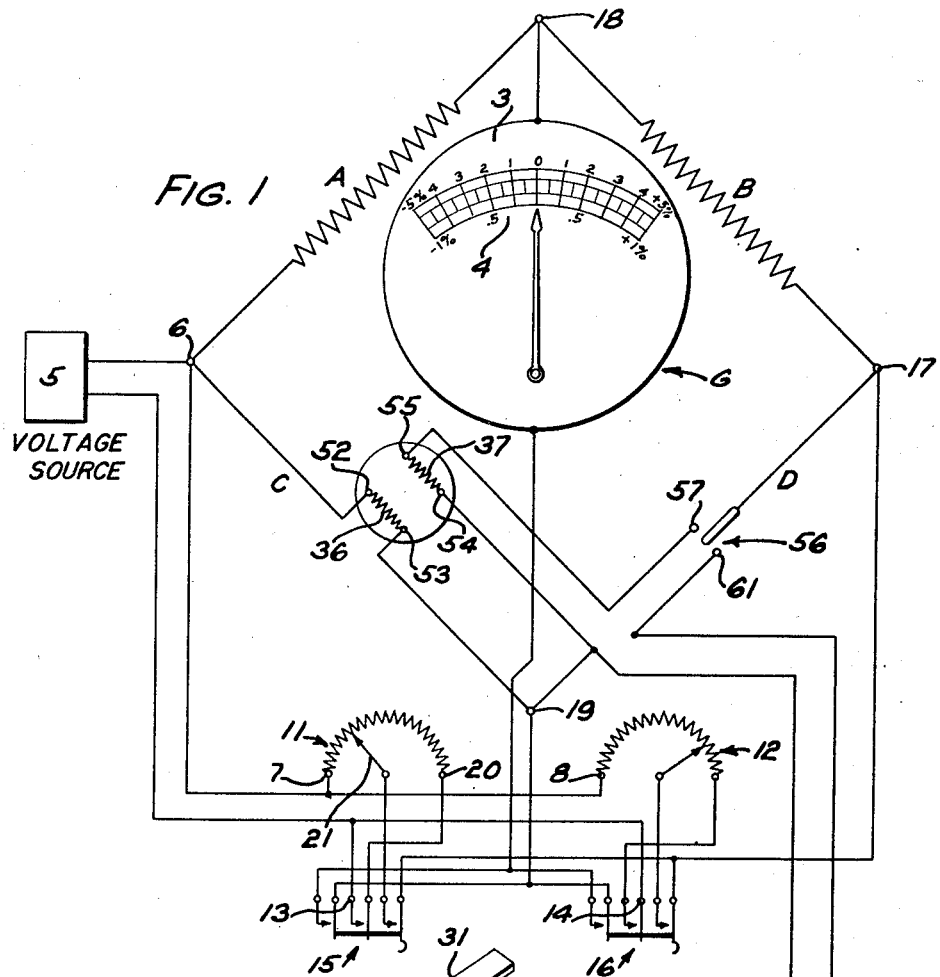
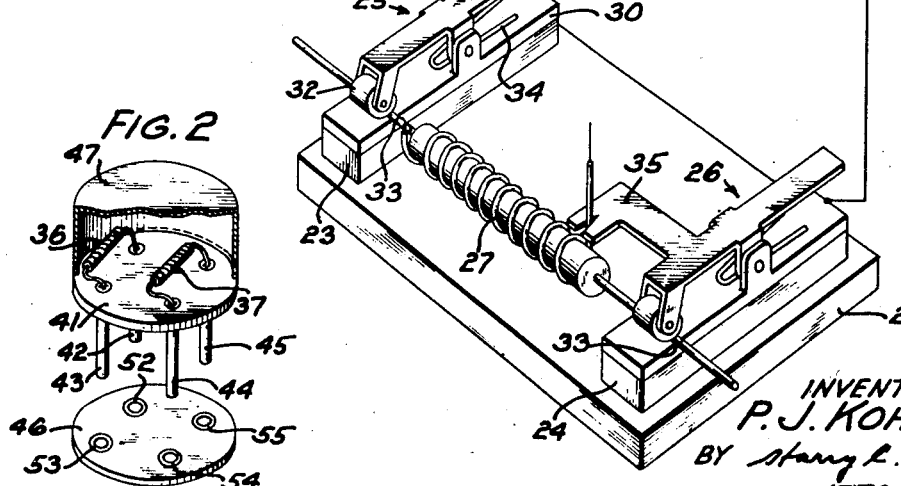
INVENTOR
P. J. KOHLER
BY Harry L. Duft
ATTORNEY Patented Oct. 24, 1950

2,527,138

UNITED STATES PATENT OFFICE 2,527,138

APPARATUS FOR MAKING RESISTANCE MEASUREMENTS

Peter J. Kohler, Chicago, Ill., assignor to Western Electric Company, Incorporated, New York, N. Y., a corporation of New York Application March 8, 1945, Serial No. 581,627

1 Claim. (Cl. 175—183)

This invention relates to apparatus for making electrical measurements and more particularly to apparatus for measuring the value of an impedance in terms of percentage deviation from a standard impedance value.

In specifying a resistor it is a common practice to designate the resistance value with the limits of tolerance expressed in percentage. For instance, for a particular use a resistor may be specified having a resistance of 1000 ohms with a tolerance of plus or minus 1% and any resistor having a resistance between 990 and 1010 ohms will then meet the specification.

Objects of the present invention are to provide apparatus for quickly and accurately determining the deviation of an impedance from a specified value.

In accordance with one embodiment of the invention a bridge circuit is provided having a galvanometer with a rough or coarse scale for first roughly measuring or adjusting the resistance value of a resistor under test and a fine scale for more precisely measuring or adjusting the resistance value, both of the scales being calibrated by means of a standard resistance which is also used in subsequently making measurements and a standard deviation resistance used only for the calibration.

A complete understanding of the invention may be had by reference to the following description taken in conjunction with the accompanying drawing, in which Fig. 1 is a circuit diagram of an apparatus embodying the invention with some of the parts shown in perspective, and Fig. 2 is a perspective view showing the standard resistors used in the apparatus on a removable plug, and also showing the socket for the plug.

The drawing shows a bridge circuit having arms A, B, C and D and a galvanometer G, the face of which is graduated with a rough scale 3 and a fine scale 4 to indicate percentages of deviation as hereinafter described. Full scale deflection of the fine scale is marked 1% on each side of zero, i. e. plus and minus 1%. For the rough scale, the full scale reading is plus and minus 5% on each side of zero. Voltage to be impressed across the bridge is supplied by a suitable voltage source 5, one side of which is permanently connected to junction 6 of the bridge and to points 7 and 8 of potentiometers 11 and 12, respectively. The other side of the voltage source is connected to contacts 13 and 14 on a pair of manually operated switches 15 and 16 which, among other functions, selectively connect either of the potentiometers across the voltage source and simultaneously apply a portion of that voltage to junction 17 of the bridge through the variable contact of the potentiometer that is then in the circuit. Unless either switch 15 or 16 is in its operative position there will be no voltage impressed across the bridge at junctions 6 and 17, nor will the galvanometer circuit between junctions 18 and 19 be completed. Switch 15 which has three pairs of contacts will, when closed, simultaneously complete the following circuits: The voltage source 5 will be connected to potentiometer 11 at a point 20 thus completing a path of current from the voltage source through the potentiometer 11; the galvanometer G will be connected in the circuit between junctions 18 and 19, and the junction 17 will be connected to the variable contact 21 of potentiometer 11. With switch 15 closed, it is apparent that the supply voltage flows through the potentiometer 11 and that part of this voltage is applied to junction 17 of the bridge through the variable contact 21 on potentiometer 11, the value of the impressed voltage being dependent upon the position of contact 21.

Closing switch 16 performs the same functions that switch 15 does with the exception that the potentiometer 12 is electrically substituted in the circuit in place of potentiometer 11 which is used to regulate the voltage impressed across junctions 6 and 17.

A base 22 supports a pair of insulating blocks 23 and 24, upon which are mounted two spring pressed roller clips indicated generally at 25 and 26, which provide support for resistor 27 under test, and means for connecting the resistor 27 into the bridge circuit. Each clip comprises a brass base 30 upon which is pivoted a movable arm 31 having a roller 32 mounted at the end of the arm 31 to come in contact with the brass base 30 in which a transverse groove 33 is formed at the point of roller contact, which contact is enforced by a hairpin spring 34 asserting an expansive force between the base 30 and the underside of the arm 31. A knife 35 having a V-shaped blade is formed on a lateral extension of the arm 31 of clip 26, forming a low resistance electrical path from the blade to the base of the clip. This construction of the clips permits a secure yet rotatable support and electrical contact for the resistor 27 under test, the terminals of which are placed in the grooves 33, and held in position by the rollers 32.

A standard calibrating resistor 36 and a second standard calibrating resistor 37 varying in ohmic value from the first by a predetermined percentage are both mounted on a flat circular plug 41 made of some insulating material and having four parallel metal prongs 42, 43, 44 and 45 to which the terminals of resistors 36 and 37 are soldered, and which are symmetrically spaced in the form of a square and disposed at right angles to the plane of the plug (Fig. 2). To shield the resistors 36 and 37 from atmospheric conditions, a suitable cover 47 may be secured to the plug 41. A socket 46 made of an insulating material is provided with four metal jacks 52, 53, 54 and 55 positioned to slidably engage the prongs of plug 41 in the following order: prong 42 with jack 52, prong 43 with jack 53, prong 44 with jack 54, and prong 45 with jack 55. The jacks are connected to the corresponding numbered points in diagram shown in Fig. 1.

The bridge is calibrated in the following manner: Assuming for example, that the problem is to standardize, while in the state of manufacture, 1000 ohm wire wound resistors, having a tolerance limit of plus or minus 1%, a standard 1000 ohm resistor 36 is placed in arm C of the bridge circuit and a second standard resistor 37 of 1010 ohms resistance, i. e. having an ohmic value 1% higher than that of the first standard resistor is placed in the arm D of the bridge. This is accomplished by inserting the plug 41 into the socket 46 and operating a switch 56 to contact 57 which closes the circuit between resistor 37 and junction 17. Switch 15 is next operated so that its contacts are closed, and the impressed voltage across junctions 6 and 17 is adjusted by means of the potentiometer 11 until the needle of galvanometer G points to plus 1% on the rough scale. Switch 15 is then opened and switch 16 closed, substituting potentiometer 12 in place of potentiometer 11 in the circuit. The voltage across junctions 6 and 17 is varied by means of the potentiometer 12 until the needle of the galvanometer indicates plus 1% on the fine scale. The apparatus is now ready to calibrate 1000 ohm resistors.

The terminals of a resistor 27 to be tested are inserted between the roller clips 21 and 22 which are connected to arm D of the bridge. The insulated resistive wire on the resistor is purposely cut longer than necessary to permit reduction in length while being standardized. One end of the wire is soldered to one terminal of the resistor and the other end is left free to permit the operator to make contact at various lengths of the wire by inserting the free end of the wire into the V-shaped opening of the knife 35 forcing the wire against the blade with just sufficient force to cut through the insulation and establish electrical contact between the blade and the wire.

The switch 56 is then operated so as to open the circuit at 57 and close the circuit at 61, thus substituting the unknown resistor 27 for the second standard resistor 37 in the circuit. Switch 15 is now operated and the reading observed on the galvanometer rough scale; if the indication is over 1%, the electrically effective length of the wire on the resistor is reduced in gradual stages, contacting the knife blade at each stage until a reading within 1% is indicated. The switch 15 is opened and switch 16 closed, and the reading on the fine scale of the glavanometer G is observed. If necessary, the length of the wire of the unknown resistor is again changed until the bridge is balanced. Then the wire is forced into the blade with sufficient force to cut it and the end is spliced to the vacant resistor terminal.

Obviously, recalibration of the bridge is unnecessary to standardize or measure any number of resistors of the same nominal or required value. To adapt the bridge to measure resistances of other nominal or required values, it is necessary to change only the standard resistors and the impressed voltage across the bridge as hereinbefore described. Change of standards is effected easily because of the mounting of the standards in pairs on removable plugs as shown herein. It is apparent that for any percentage variation from the nominal or required value the amount of galvanometer deflection will always be the same as long as the voltage impressed across junctions 16 and 17 is adjusted for the particular standards then in the circuit. Another feature is that the operator is at all times aware of the percentage of deviation from the required value, making it much easier and faster to calibrate resistors.

What is claimed is:

An apparatus for measuring resistance comprising a bridge circuit having an input circuit, an output circuit and an indicator connected to said output circuit, a first standard resistance, a second standard resistance having a known variation from said first standard resistance, means for connecting said first standard resistance in one arm of said bridge circuit and said second standard impedance in another arm of said bridge circuit comprising a base for supporting both said standard resistances having terminals connected to said standard resistances and a receptacle to receive said base, said receptacle being provided with terminals connected to the bridge circuit and adapted to make contact with said base terminals for properly connecting said standard resistances into said bridge, voltage supply means for applying a voltage to said input circuit to provide a rough indication of said known variation, a second voltage supply means for applying a voltage to said input circuit to provide a fine indication of said known variation, means for selectively connecting either of said voltage supply means to said input circuit, and switching means for selectively connecting either said second standard resistance or an unknown resistance to be tested into said other arm of said bridge.

PETER J. KOHLER.

REFERENCES CITED

The following references are of record in the file of this patent:

UNITED STATES PATENTS

| Number | Name | Date |
|---|---|---|
| 955,191 | Northup et al. | Apr. 19, 1910 |
| 1,460,530 | Brown et al. | July 3, 1923 |
| 1,494,586 | Cary | May 20, 1924 |
| 1,537,281 | Wunsch | May 12, 1925 |
| 1,665,397 | Wunsch | Apr. 10, 1928 |
| 1,877,739 | Schneider | Sept. 13, 1932 |
| 1,951,461 | Wilson | Mar. 20, 1934 |
| 1,961,965 | Fisher | June 5, 1934 |
| 2,339,116 | Smith | Jan. 11, 1944 |

OTHER REFERENCES

Instruments, Nov. 1934, pages 233 and 239.